(12) United States Patent
Golly et al.

(10) Patent No.: US 11,209,330 B2
(45) Date of Patent: Dec. 28, 2021

(54) CORROSION RESISTANT SLEEVE FOR AN AIR DATA PROBE

(71) Applicant: Rosemount Aerospace Inc., Burnsville, MN (US)

(72) Inventors: Timothy Thomas Golly, Lakeville, MN (US); Paul Robert Johnson, Prior Lake, MN (US); Greg Seidel, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 48 days.

(21) Appl. No.: 16/918,224

(22) Filed: Jul. 1, 2020

(65) Prior Publication Data

US 2020/0333206 A1 Oct. 22, 2020

Related U.S. Application Data

(63) Continuation-in-part of application No. 15/844,067, filed on Dec. 15, 2017, now abandoned, which is a
(Continued)

(51) Int. Cl.
*G01L 19/06* (2006.01)
*G01L 13/00* (2006.01)
(Continued)

(52) U.S. Cl.
CPC .......... *G01L 19/0627* (2013.01); *B64D 43/02* (2013.01); *B64D 47/00* (2013.01); *G01L 13/00* (2013.01); *G01P 5/165* (2013.01)

(58) Field of Classification Search
CPC ...... G01P 13/025; G01P 5/165; G01P 21/025; G01P 5/16; G01P 5/14; G01P 5/26;
(Continued)

(56) References Cited

U.S. PATENT DOCUMENTS

| 2,254,155 A | 8/1941 | Reichel |
| 2,343,282 A | 3/1944 | Daiber |

(Continued)

FOREIGN PATENT DOCUMENTS

| CN | 2420633 Y | 2/2001 |
| CN | 102735888 A | 10/2012 |

(Continued)

OTHER PUBLICATIONS

Extended European Search Report for EP Application No. 19213580. 4, dated Jun. 26, 2020, pp. 4.
(Continued)

*Primary Examiner* — Andre J Allen
(74) *Attorney, Agent, or Firm* — Kinney & Lange, P.A.

(57) ABSTRACT

A corrosion resistant apparatus for an air data probe with a sleeve being cylindrical in shape with a first end and a second end, at least one circumferentially extending groove on an outside of the sleeve configured to accommodate coils of a heater, and a bore at a center of the sleeve and extending between the first end and the second end configured to provide a pneumatic pathway that allows atmospheric conditions to reach measurement equipment of the air data probe.

17 Claims, 2 Drawing Sheets

Related U.S. Application Data continuation-in-part of application No. 15/067,650, filed on Mar. 11, 2016, now Pat. No. 10,227,139.

(60) Provisional application No. 62/137,080, filed on Mar. 23, 2015.

(51) Int. Cl.
*G01P 5/165* (2006.01)
*B64D 47/00* (2006.01)
*B64D 43/00* (2006.01)
*B64D 43/02* (2006.01)

(58) Field of Classification Search
CPC .. G01P 5/245; G01P 21/00; G01P 5/00; G01P 1/026; G01P 5/02; G01P 13/02; G01P 5/17; G01P 3/62; G01P 5/12; G01P 5/175; G01P 1/00; G01P 5/10; G01P 5/20; G01P 1/10; G01P 15/165; G01P 15/18; G01P 5/06; G01P 1/02; G01P 15/09; G01P 5/24; G01P 15/00; G01P 21/02; G01P 3/00; G01P 7/00; B64D 43/02; B64D 15/12; B64D 15/20; B64D 43/00; B64D 45/00; B64D 15/22; B64D 2045/0085; B64D 15/14; B64D 39/02; B64D 39/00; B64D 27/02; B64D 39/04; B64D 15/00; B64D 31/06; B64D 2203/00; B64D 39/06; B64D 47/00; B64D 47/02; B64D 15/02; B64D 2041/005; B64D 2221/00; B64D 35/00; B64D 35/04; B64D 37/06; B64D 37/32; B64D 45/0005; B64D 47/08; B64D 1/22; B64D 11/04; B64D 13/04; B64D 15/04; B64D 15/16; B64D 2013/0603; B64D 2027/026; B64D 2033/0233; B64D 2045/007; B64D 27/24; B64D 29/00; B64D 33/02; B64D 45/02; B64D 45/08; B64D 7/00
USPC ..................................................... 73/170.02
See application file for complete search history.

(56) References Cited

U.S. PATENT DOCUMENTS

| | | |
|---|---|---|
| 2,381,327 A | 8/1945 | Woodman et al. |
| 2,393,593 A | 1/1946 | Daiber |
| 2,399,370 A | 4/1946 | McOrlly |
| 2,428,542 A | 10/1947 | Bernhardt |
| 2,601,331 A | 6/1952 | Segal |
| 2,640,347 A | 6/1953 | Majeski |
| 2,984,107 A | 5/1961 | Strieby et al. |
| 2,987,565 A | 6/1961 | Barnhart et al. |
| 3,267,992 A | 8/1966 | Werner et al. |
| 3,400,583 A | 9/1968 | Newport et al. |
| 3,535,930 A | 10/1970 | Rees |
| 3,590,460 A | 7/1971 | Highducheck |
| 3,885,613 A | 5/1975 | Evans |
| 4,312,120 A | 1/1982 | Comer |
| 4,615,213 A | 10/1986 | Hagan |
| 4,836,019 A | 6/1989 | Hagen et al. |
| 5,025,661 A | 6/1991 | McCormack |
| 5,046,360 A | 9/1991 | Hedberg |
| 5,062,869 A | 11/1991 | Hagen |
| 5,130,707 A | 7/1992 | Hagen |
| 5,220,319 A | 6/1993 | Kendel |
| 5,228,563 A | 7/1993 | Stringham |
| 5,232,086 A | 8/1993 | Montanari |
| 5,392,622 A | 2/1995 | O'Donnell |
| 5,458,008 A | 10/1995 | Rassatt |
| 5,460,022 A | 10/1995 | Parsons |
| 5,466,067 A | 11/1995 | Hagen et al. |
| 5,487,291 A | 1/1996 | Voigt |
| 5,495,942 A | 3/1996 | Izhak |
| 5,543,183 A | 8/1996 | Streckert et al. |
| 5,621,936 A | 4/1997 | Penaligon et al. |
| 5,653,538 A | 8/1997 | Phillips |
| 5,731,507 A | 3/1998 | Hagen et al. |
| 5,740,857 A | 4/1998 | Thompson et al. |
| 6,062,869 A | 5/2000 | Mizobuchi et al. |
| 6,070,475 A | 6/2000 | Muehlhauser et al. |
| 6,079,845 A | 6/2000 | Kreider |
| 6,237,756 B1 | 5/2001 | Caudle |
| 6,323,420 B1 | 11/2001 | Head |
| 6,371,286 B1 | 4/2002 | Montanari |
| 6,419,186 B1 | 7/2002 | Bachinski et al. |
| D463,989 S | 10/2002 | Bachinski et al. |
| 6,550,344 B2 | 4/2003 | Bachinski et al. |
| 6,591,696 B2 | 7/2003 | Bachinski |
| 6,612,166 B2 | 9/2003 | Golly et al. |
| 6,648,939 B2 | 11/2003 | Neuschwander et al. |
| 6,740,857 B1 | 5/2004 | Furlong et al. |
| 6,813,942 B1 | 11/2004 | Vozhdaev et al. |
| 6,840,672 B2 | 1/2005 | Ice et al. |
| 6,892,584 B2 | 5/2005 | Gilkison et al. |
| 6,941,805 B2 | 9/2005 | Seidel et al. |
| 7,370,526 B1 | 5/2008 | Ice |
| 7,549,331 B1 | 6/2009 | Powell |
| 7,597,018 B2 | 10/2009 | Braun et al. |
| 7,705,275 B2 | 4/2010 | Umotoy et al. |
| 7,716,980 B1 | 5/2010 | Colten et al. |
| 7,915,567 B2 | 3/2011 | Lhuillier |
| 7,937,977 B2 | 5/2011 | Booker |
| 8,060,334 B1 | 11/2011 | Jarvinen |
| 8,225,696 B2 | 7/2012 | Downes |
| 8,341,989 B1 | 1/2013 | Hamblin et al. |
| 8,365,591 B2 | 2/2013 | Golly |
| 8,485,007 B2 | 7/2013 | Downes |
| 8,718,955 B2 | 5/2014 | Golly et al. |
| 8,857,255 B2 | 10/2014 | Anderson et al. |
| 9,207,253 B2 | 12/2015 | Seidel et al. |
| 9,279,684 B2 | 3/2016 | Marty et al. |
| 9,541,429 B2 | 1/2017 | Farokhi et al. |
| 9,664,542 B2 | 5/2017 | Gordon et al. |
| 9,719,820 B1 | 8/2017 | Jacob et al. |
| 9,722,345 B2 | 8/2017 | Arnesson et al. |
| 9,791,304 B2 | 10/2017 | Wong et al. |
| 9,856,027 B2 | 1/2018 | Anderson et al. |
| 9,891,083 B2 | 2/2018 | Gordon et al. |
| 9,918,524 B2 | 3/2018 | Byrd et al. |
| 9,976,882 B2 | 5/2018 | Seidel et al. |
| 10,024,877 B2 | 7/2018 | Golly et al. |
| 10,227,139 B2 | 3/2019 | Golly et al. |
| 10,234,475 B2 | 3/2019 | Sarno et al. |
| 10,281,303 B2 | 5/2019 | Johnson et al. |
| 10,384,787 B2 | 8/2019 | Gordon et al. |
| 10,605,637 B2 | 3/2020 | Gordon et al. |
| 10,884,014 B2 | 1/2021 | Golly et al. |
| 10,955,433 B2 | 3/2021 | Jacob et al. |
| 2004/0085211 A1 | 5/2004 | Gotfried |
| 2004/0093953 A1 | 5/2004 | Gilkison et al. |
| 2004/0177683 A1 | 9/2004 | Ice |
| 2004/0244477 A1 | 12/2004 | Zippold et al. |
| 2005/0011285 A1 | 1/2005 | Giterman |
| 2005/0179542 A1 | 8/2005 | Young |
| 2006/0144007 A1 | 7/2006 | Azarin |
| 2006/0207753 A1 | 9/2006 | Sanatgar |
| 2007/0079639 A1 | 4/2007 | Hsu |
| 2010/0000885 A1 | 1/2010 | Downes |
| 2010/0123549 A1 | 5/2010 | Lickfelt et al. |
| 2011/0036160 A1 | 2/2011 | Pineau et al. |
| 2012/0280498 A1 | 11/2012 | Irwin et al. |
| 2013/0014586 A1 | 1/2013 | Walling et al. |
| 2013/0145862 A1 | 6/2013 | Leblond et al. |
| 2014/0053644 A1 | 2/2014 | Anderson et al. |
| 2014/0156226 A1 | 6/2014 | Hashemian et al. |
| 2014/0332192 A1 | 11/2014 | Cosby, II et al. |
| 2015/0356393 A1 | 12/2015 | Daoura et al. |
| 2016/0091355 A1 | 3/2016 | Mesnard et al. |
| 2016/0280391 A1 | 9/2016 | Golly et al. |
| 2017/0052046 A1 | 2/2017 | Gordon et al. |

(56) References Cited

U.S. PATENT DOCUMENTS

| | | |
|---|---|---|
| 2017/0086656 A1 | 3/2017 | Hiratsuka |
| 2017/0092030 A1 | 3/2017 | Badger, II |
| 2017/0108360 A1 | 4/2017 | Wong et al. |
| 2017/0110838 A1 | 4/2017 | Sasaki |
| 2017/0115139 A1 | 4/2017 | Wong et al. |
| 2017/0169974 A1 | 6/2017 | Miyakawa et al. |
| 2017/0199063 A1 | 7/2017 | Gordon et al. |
| 2017/0369175 A1 | 12/2017 | Gordon et al. |
| 2018/0128849 A1 | 5/2018 | Wong et al. |
| 2018/0175518 A1 | 6/2018 | Mori et al. |
| 2018/0209863 A1 | 7/2018 | Golly et al. |
| 2018/0259547 A1 | 9/2018 | Abdullah et al. |
| 2018/0259548 A1 | 9/2018 | Anderson et al. |
| 2019/0186974 A1 | 6/2019 | Golly et al. |
| 2019/0234986 A1* | 8/2019 | Ortelt ............... G01P 5/165 |
| 2019/0383848 A1* | 12/2019 | Matheis ............. G01K 13/028 |
| 2020/0109982 A1* | 4/2020 | Jacob ............... G01P 5/165 |
| 2020/0114428 A1 | 4/2020 | Golly et al. |
| 2020/0123650 A1* | 4/2020 | Poteet .............. C23C 16/045 |
| 2020/0141964 A1 | 5/2020 | Marty et al. |
| 2020/0233007 A1* | 7/2020 | Jacob ............... B64D 15/12 |
| 2020/0309808 A1 | 10/2020 | Golly et al. |
| 2021/0048322 A1* | 2/2021 | Poteet .............. G01F 1/05 |
| 2021/0055143 A1 | 2/2021 | Wigen et al. |
| 2021/0127458 A1* | 4/2021 | Jacob ............... H05B 3/58 |

FOREIGN PATENT DOCUMENTS

| | | |
|---|---|---|
| EP | 0737315 A1 | 10/1996 |
| EP | 3073275 A2 | 9/2016 |
| EP | 3076185 A1 | 10/2016 |
| EP | 3133403 A1 | 2/2017 |
| EP | 3214704 A1 | 9/2017 |
| EP | 3499217 A2 | 6/2019 |
| GB | 562880 | 7/1944 |
| GB | 1118794 | 7/1968 |
| WO | WO9613727 A1 | 5/1996 |
| WO | WO9816837 A1 | 4/1998 |
| WO | WO0111582 A1 | 2/2001 |
| WO | WO0167115 A2 | 9/2001 |
| WO | WO0177622 A2 | 10/2001 |

OTHER PUBLICATIONS

Extended European Search Report for EP Application No. 19213580.4, dated Jun. 26, 2020, pp. 13.
Bifilar Coil, Wikipedia, as captured by the Internet Archive on Aug. 2, 2015, 3 pages.
Extended European Search Report for EP Application No. 18207317.1, dated May 24, 2019, pp. 7.
Extended European Search Report for EP Application No. 19207424.3, dated Mar. 13, 2020, pp. 8.
Extended European Search Report for EP Application No. 19215840.0, dated Jul. 3, 2020, pp. 14.

* cited by examiner

CORROSION RESISTANT SLEEVE FOR AN AIR DATA PROBE

CROSS-REFERENCE TO RELATED APPLICATION

This application is a continuation-in-part of U.S. application Ser. No. 15/844,067 filed Dec. 15, 2017 for "CORROSION RESISTANT SLEEVE FOR AN AIR DATA PROBE" by T. T. Golly, P. R. Johnson and G. A. Seidel, which in turn claims the benefit of continuation-in-part of U.S. application Ser. No. 15/067,650 filed Mar. 11, 2016 for "HEATED AIR DATA PROBES" by T. T. Golly, P. R. Johnson and G. Seidel which in turn claims the benefit of U.S. Provisional Application No. 62/137,080 filed Mar. 23, 2015 for "HEATED AIR DATA PROBES" by T. T. Golly, P. R. Johnson and G. Seidel.

FIELD OF THE INVENTION

The present disclosure relates to air data probes and, in particular, to a corrosion resistant sleeve within a probe head for protecting heater coils and other internal components of the air data probe.

BACKGROUND

Air data probes operate in severe environments, which often cause corrosion within the air data probes due to exposure to atmospheric conditions. The most severe corrosion occurs at or near the hottest areas of the air data probes, typically along the inside and outside of the forward portion of the probe head. These areas experience higher operating temperatures than the remainder of the air data probe because the heat flux from a heater within the air data probe is heavily biased toward the probe head in order to provide the necessary anti-icing performance. The heater can include a hermetically sealed sheath, which surrounds the electrical wires of the heater. The hermetically sealed sheath is especially susceptible to corrosion due of its operating temperature and location within the probe, and also because atmospheric contaminants may be collected and concentrated around the heater sheath by internal probe features such as water dams or bulkheads. The heater sheath is a thin-walled tube and is therefore only able to sustain a limited amount of corrosion damage while maintaining a hermetically sealed environment and electrical insulation for the heater wires. Heater failure occurs rapidly after any breach of the heater sheath because the electrical insulation is severely degraded by any exposure to water or other environmental contaminants. The heater is not a repairable item and the entire air data probe must be replaced upon failure of the heater.

SUMMARY

A corrosion resistant sleeve for an air data probe with a sleeve being cylindrical in shape with a first end and a second end, at least one circumferentially extending groove on an outside of the sleeve configured to accommodate heater coils, and a bore at a center of the sleeve and extending between the first end and the second end configured to provide a pneumatic pathway that allows allow atmospheric conditions to reach measurement equipment of the air data probe.

An air data probe includes sleeve having a first end and a second end with the sleeve including a circumferentially extending groove on an outside surface and a bore extending along a center of the sleeve between the first end and the second end, a heater having a wire coil within the groove of the sleeve, measurement equipment configured to measure atmospheric conditions provided to the measurement equipment through the bore in the sleeve, and a shell outward from the sleeve and heater coil with the shell having an opening adjacent to the bore at the first end of the sleeve. The sleeve is configured to work in conjunction with the shell and braze materials to completely encapsulate the most vulnerable portions of the heater and prevent corrosive elements from coming into contact with the heater coils.

A method of constructing an air data probe includes winding a heater coil onto a sleeve with the sleeve having a circumferential groove to accommodate the heater coil and a bore extending between a forward end and a rear end. The method further includes coating the heater coil and sleeve in a braze slurry; inserting the heater coil and sleeve into a shell; heating the heater coil, sleeve, shell, and braze slurry to liquefy the braze slurry; and cooling the heater coil, sleeve, shell, and braze slurry to allow the braze slurry to solidify to seal the heater coil and sleeve within the shell to prevent corrosion to the heater coil.

DETAILED DESCRIPTION

A corrosion resistant sleeve for an air data probe is disclosed herein. This corrosion resistant sleeve protects a heater and other components within the air data probe from corrosion resulting from contact with the environment, while still allowing atmospheric conditions (including pressure measured by pressure sensors) to reach measurement equipment within the air data probe. The corrosion resistant sleeve is positioned within a shell (collectively, the probe head) of the air data probe with the sleeve including at least one circumferentially extending groove to accommodate coils of a heater and a bore that allows atmospheric conditions, such as measured pressure, to reach the measurement equipment. The sleeve can optionally include a tip integral with the sleeve and extending out from the shell such that an outer surface of the tip and an outer surface of the shell are adjacent one another and can be connected to one another with braze or by other means. The sleeve may also optionally include integral water dams, bulkheads, and may include a smooth internal bore or a bore conformal to the exterior grove to maximize internal volume. Further, the probe head can be connected to a strut, which in turn is connected to an aircraft with the air data probe providing information about the environment in which the aircraft is present.

The air data probe, including the corrosion resistant sleeve, can be constructed by installing the heater coil onto the sleeve, coating the heater coil and sleeve with a braze slurry, placing the heater coil and sleeve into the shell, liquefying the braze through the use of heat, and cooling the components so that the braze solidifies and seals the heater coil and sleeve within the shell. This method utilizes braze to seal and protect the internal components of the probe head (along with the sleeve), eliminating the need for welding or other machining/adhesion steps within the shell.

Figure 1A:
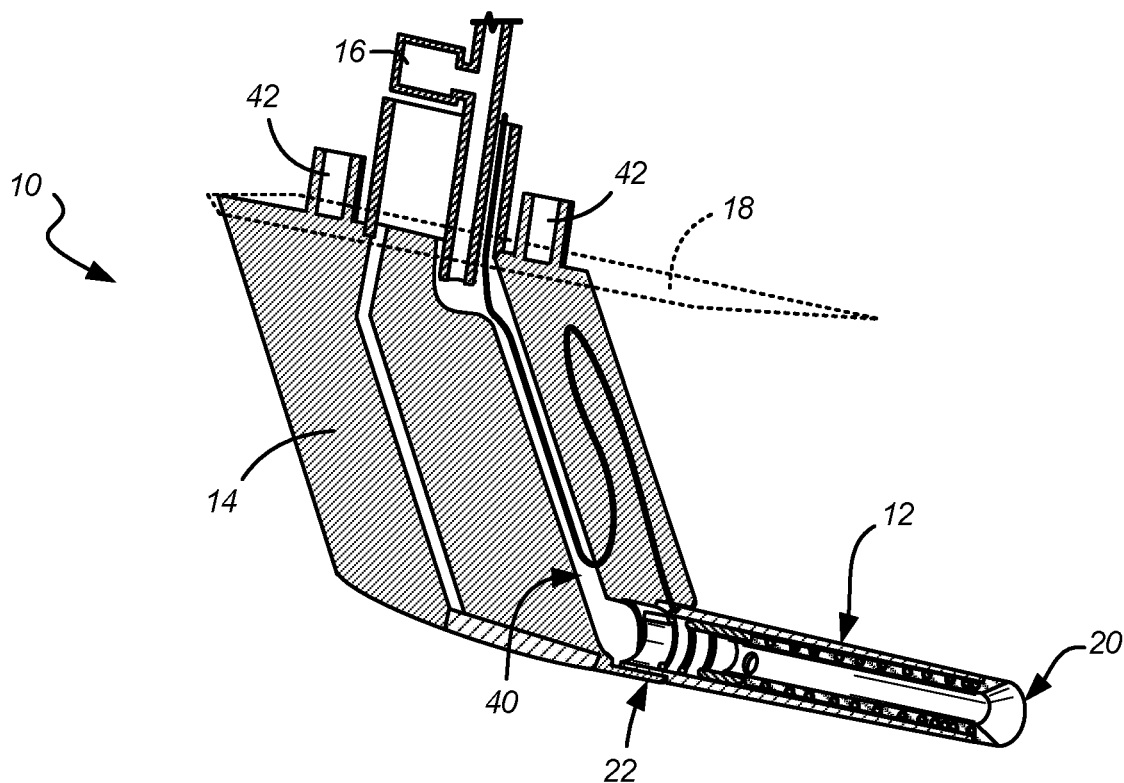
FIG. 1A is a cross-sectional side view of an exemplary air data probe.
Figure 1B:
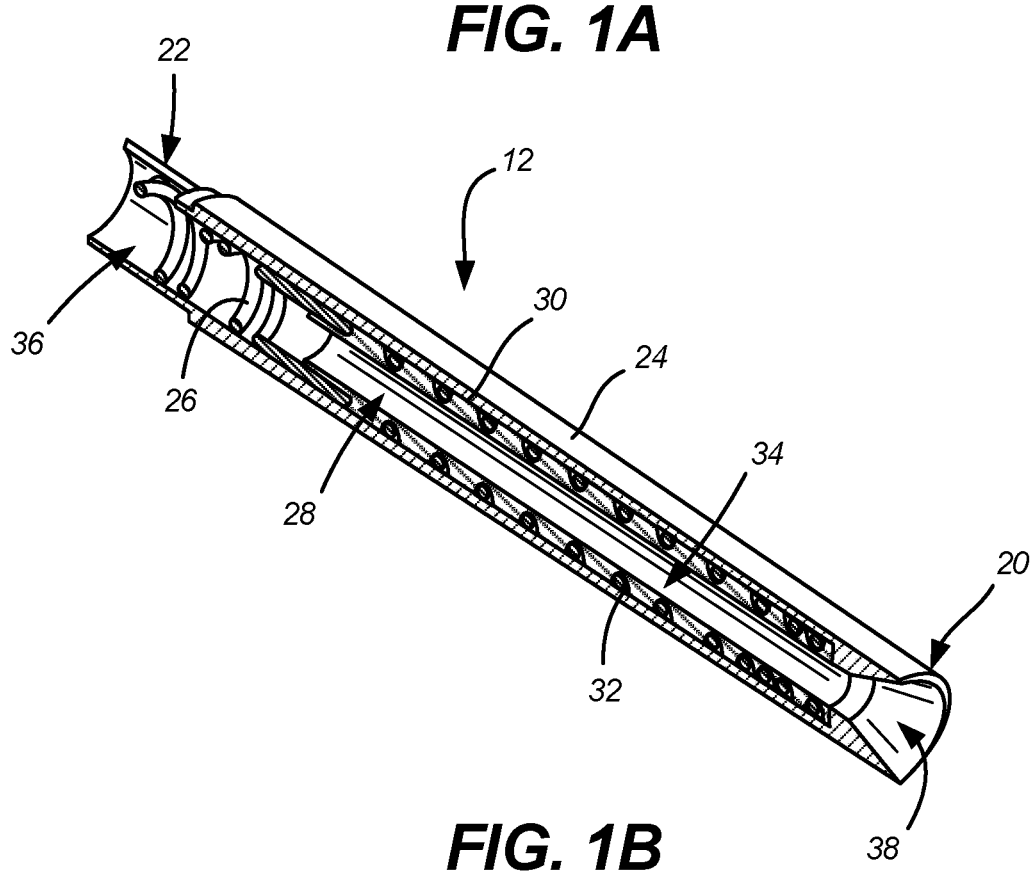
FIG. 1B is an enlarged cross-sectional view of a probe head of the air data probe.

FIG. 1A is a cross-sectional side view of air data probe 10, while FIG. 1B is an enlarged cross-sectional view of probe head 12 of air data probe 10. Air data probe 10 includes probe head 12, strut 14, and measurement equipment 16, and is situated in or on aircraft 18. Probe head 12 includes first end 20, second end 22, shell 24, heater coils 26, sleeve 28, and braze 30. Sleeve 28 includes groove 32 and bore 34. Shell 24 includes axial cavity 36 extending between first end 20 and second end 22 and opening 38 adjacent first end 20. Strut 14 includes channel 40 and mounting holes 42 for fastening strut 14 to aircraft 18.

Air data probe 10 is connected to aircraft 18 and is configured to take measurements of the atmospheric conditions in which aircraft 18 is present. While air data probe 10 includes measurement equipment 16 configured to measure a variety of characteristics of the atmospheric conditions, measurement equipment 16 can be configured to measure atmospheric pressure through the use of one or more absolute and/or differential pressure sensors, which can be present within aircraft 18. Additionally, measurement equipment 16 can be a pitot pressure sensor configured to measure total pressure. Air data probe 10 includes probe head 12, which provides means through which atmospheric conditions can reach measurement equipment 16. Probe head 12 is connected to strut 14, which fastens probe head 12 to aircraft 18 through the use of mounting holes 42 and fasteners. Strut 14 also includes channel 40 extending from probe head 12 to measurement equipment 16 for allowing atmospheric conditions to reach measurement equipment 16. Strut 18 can also include a portion of heater coils 26 that provides heat to strut 18 and channel 40 to ensure ice does not form within channel 40 and atmospheric conditions can reach measurement equipment 16. Strut 18 can have a variety of shapes and sizes, or air data probe 10 can include a configuration in which strut 18 is not present and probe head 12 is connected directly to aircraft 18.

Probe head 12 has a hollow, substantially cylindrical shape that extends outward from strut 14. Probe head 12 has opening 38 at first end 20 and is fastened to strut 18 at second end 22. As mentioned above, probe head 12 provides an aperture through which the measured pressure and other atmospheric conditions can reach measurement equipment 16. Probe head 12 includes shell 24 on a radially outer surface, sleeve 28 radially within shell 24, and heater coils 26 substantially between shell 24 and sleeve 28 to ensure ice does not form in axial cavity 36 within shell 24. Heater coils 26 can be one or multiple wires, such as a bifilar coil, that provide heat to probe head 12.

Shell 24 includes axial cavity 36 extending between first end 20 and second end 22 and opening 38 to axial cavity 36 at first end 20. Shell 24 can be substantially cylindrical in shape. Shell 24 provides an outer surface of probe head 12 and protects the internal components of probe head 12 from the environment. Shell 24 can be nonporous to prevent water and other contaminants in the environment from penetrating shell 24 and contacting the internal components of probe head 12, such as the outside surface of sleeve 28 and heater coil 26. The material(s) of shell 24 should be compatible with braze and the other materials used to seal shell 24 and the components within probe head 12. Shell 24 can have other configurations, such as a frusticonical shape that is larger at second end 22 than at first end 20. As shown in FIGS. 1A and 1B, opening 38 of shell 24 is tapered such that opening 38 has an increasing cross-sectional area as opening 38 extends towards first end 20 with opening 38 having a cross-sectional area at an interface with axial cavity 36 that is less than a cross-sectional area of axial cavity 36. With this configuration, there is a smooth transition from opening 38 into axial cavity 36 because the thickness of sleeve 28 (within axial cavity 36) is the difference in cross-sectional area between axial cavity 36 and opening 38 at that interface (i.e., a diameter of opening 38 at this interface is similar to a diameter of bore 34 of sleeve 28). However, opening 38 can have another configuration, such as one that has a constant cross-sectional area that is the same or different from a cross-sectional area of axial cavity 36. Shell 24 can be made from a variety of materials suitable to handle the environmental conditions, such as nickel and/or other materials.

Sleeve 28 fits within shell 24 and is configured to protect heater coils 26 from corrosion due to contaminants of the atmospheric conditions. Sleeve 28 extends within axial cavity 36 of shell 24 and has groove 32 and bore 34. Sleeve 28 can be a hollow cylindrical shape (with bore 34 at a center) to correspond to axial cavity 36 of shell 24, and sleeve 28 can be configured to extend entirely from first end 20 to second end 22 or extend only for a portion of axial cavity 36. In the embodiment of FIGS. 1A and 1B, sleeve 28 extends only from the interface between axial cavity 36 and opening 38 to a point near, but not at, second end 22. However, as will be described with regards to FIG. 2, other embodiments of sleeve 28 can include a tip integral with sleeve 28 such that the tip extends forward of opening 38 of shell 24. Sleeve 28 can be constructed from a variety of materials suitable for preventing corrosion of heater coils 26 and other components of probe head 12, such as nickel and/or other materials.

Groove 32 is located on a radially outside surface of sleeve 28, and extends at least partially circumferentially to accommodate heater coils 26. Some embodiments of sleeve 28 can include multiple axially-distributed grooves 32. In other embodiments, groove 32 can be a partially circumferentially-extending groove extending in a spiral configuration around sleeve 28 from first end 20 to second end 22. Groove 32 can have any cross-sectional shape configured to accommodate heater coils 26, and groove 32 can have any number of spirals or other features. However, groove 32 should not be so deep (i.e., extending into sleeve 28) that groove 32 extends entirely through sleeve 28. Groove 32 can be sized with a width substantially equal to or slightly larger than one strand of heater coil 26 such that only one strand (i.e., one cross section) of heater coil 26 is able to fit within groove 32 as heater coil 26 is wound around sleeve 28. Such a configuration provides for strands/windings of heater coil 26 that are not in contact axially with other strands/windings of heater coil 26. Sleeve 28 provides a protective barrier between heater coils 26 and deleterious contaminants within atmospheric that could otherwise cause corrosion.

Bore 34 can be at the center of sleeve 28 and extend along a length of sleeve 28. Bore 34 is configured to allow measured pressure (and other atmospheric conditions) to reach second end 22 of probe head 12 and eventually reach measurement equipment 16. Bore 34 can have a constant or varying cross-sectional area, but the cross-sectional area of bore 34 (and axial cavity 36 to contain sleeve 28) should be sized so as to allow measured pressure to reach measurement equipment 16 without becoming clogged or otherwise affecting the measured pressure prior to reaching measurement equipment 16. Bore 34 can be a smooth pathway or may be ridged corresponding to groove 32 (i.e., the thickness of sleeve 28 is constant such that bore 34 has ridges where groove 32 is in sleeve 28). Various water dams or bulkheads may optionally be integrated into sleeve 28.

As mentioned above, sleeve 28 within shell 24 protects heater coils 26 from corrosion due to contaminants within bore 34 and axial cavity 36. Heater coils 26 are sealed within axial cavity 36 of shell 24 by sleeve 28. Sleeve 28 and heater coils 26 can be sealed within axial cavity 36 through the use of braze 30, which is applied to heater coils 26 and sleeve 28 during the manufacture process. For example, to construct probe head 12 of air data probe 10, heater coils 26 are first wound into grooves 32 in sleeve 28. Then, heater coils 26 and sleeve 28 are coated in a slurry of braze 30, which can be in a fluid form by being at an elevated temperature. After being coated with the slurry of braze 30, heater coils 26 and sleeve 28 are inserted into axial cavity 36 in shell 24. During the insertion, a portion of the slurry of braze 30 may be scraped off. However, another portion of the slurry of braze 30 will still be present on heater coils 26 and sleeve 28 in an area between sleeve 28 and shell 24. With heater coils 26 and sleeve 28 within axial cavity 36 in shell 24, probe head 12 is then heated to at least partially liquefy the slurry of braze 30 such that the slurry can flow into gaps between heater coils 26, sleeve 28, and axial cavity 36. Finally, probe head 12 can be allowed to cool to solidify braze 30 (such that the slurry is now not a slurry but just solid braze 30) to seal heater coils 26 and sleeve 28 to shell 24 to prevent corrosion to heater coils 26. Once probe head 12 is constructed, probe head 12 can be fastened to strut 14, which is either already fastened to aircraft 18 adjacent measuring equipment 16 or then will be fastened to aircraft 18. If braze 30 is not utilized, heater coils 26 and sleeve 28 can be sealed within shell 24 by other means, such as by welding. If sleeve 28 includes a tip integral with sleeve 28 (as shown in FIG. 2), the method of constructing probe head 12 may additionally include fastening an outer surface of the tip to an outer surface of shell 24 using braze or another material/method, such as welding.

Figure 2:
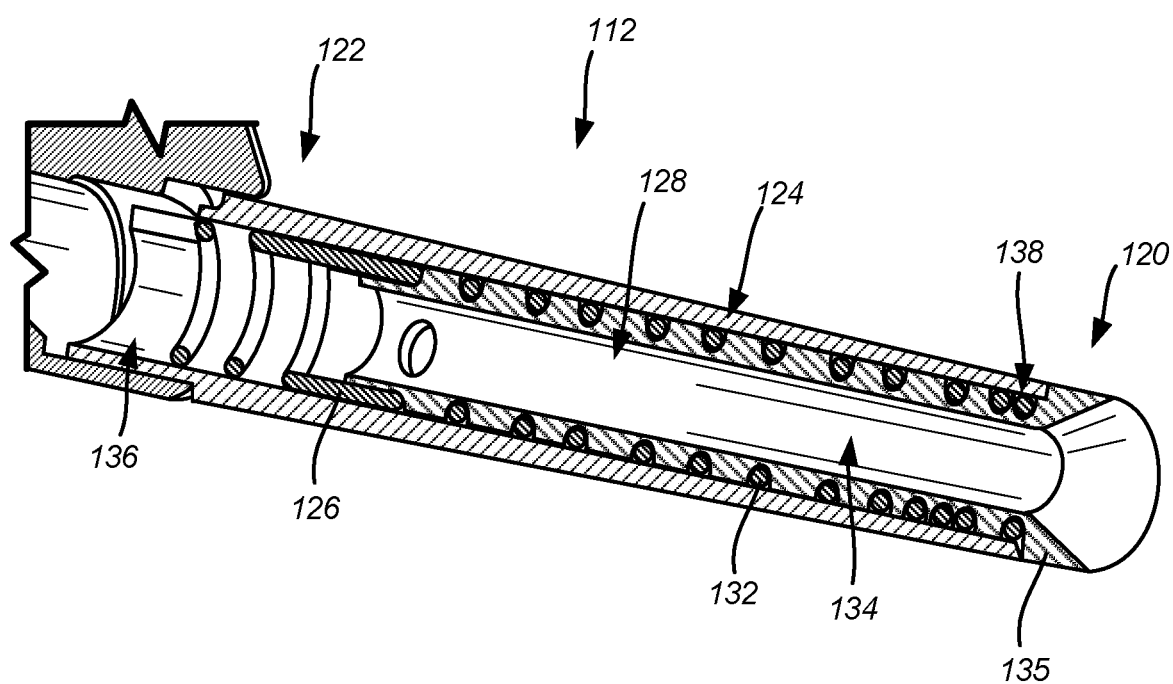
FIG. 2 is an enlarged cross-sectional view of a second embodiment of a probe head.

FIG. 2 is an enlarged cross-sectional view of a second embodiment of probe head 112. Probe head 112 includes first end 120, second end 122, shell 124, heater coils 126, and sleeve 128. Sleeve 128 includes groove 132, bore 134, and tip 135, while shell 124 includes axial cavity 136 and opening 138. The air data probe of which probe head 112 is a component of is similar to air data probe 10 in FIG. 1A, and the components of probe head 112 are similar to those of probe head 12 in FIGS. 1A and 1B except that opening 138 is an extension of axial cavity 136. Further, sleeve 128 includes tip 135 that can be integral with sleeve 128.

Shell 124 of probe head 112 includes axial cavity 136, which can have a constant cross-sectional area, and opening 138 at first end 20. Different than shell 24 of probe head 12, opening 138 is configured to not be a forward-most point of probe head 112. Rather, tip 135 of sleeve 128 is the forward-most point of probe head 112.

Tip 135 can be a separate component from sleeve 128 or, as shown in FIG. 2, can be integral with sleeve 128 such that sleeve 128 and tip 135 form one continuous piece. Tip 135 is at first end 120, and bore 134 of sleeve 128 extends through tip 135 such that bore 134 extends entirely through sleeve 128 to allow measured pressure to reach the measurement equipment. Bore 134 within tip 135 can have a cross-sectional area that is the same as bore 134 within sleeve 128 or, as shown in FIG. 2, bore 134 within tip 135 can have an increasing cross-sectional area as bore 134 extends within tip 135 towards first end 120. Tip 135 can have an outer diameter of an outer surface that is constant or tapered and the same as an outer diameter of an outer surface of shell 124 so that an interface between the outer surface of tip 135 and the outer surface of shell 124 is smooth. Tip 135 can be fastened to shell 124 using a variety of materials, such as welding or braze. The connection between tip 135 and shell 124 should be such that contaminants in the atmospheric conditions are prevented from entering a gap between shell 124 and sleeve 128, thereby preventing corrosion of heater coils 126. With sleeve 128 including tip 135, the connection between tip 135 and shell 124 can be easily viewed and inspected by assembly or inspection personnel to determine if the quality of the braze joint is sufficient to prevent contaminants (such as water and/or other fluids) from infiltrating the gap between shell 124 and sleeve 128.

Whether air data probe 10 includes probe head 12/112 having sleeve 28/128 with tip 135 or without tip 135, sleeve 28/128 is configured within axial cavity 36/136 of shell 24/124 to prevent corrosion to heater coils 26/126 and other components of probe head 12/112. With heater coils 26/126 being sealed between shell 24/124 and sleeve 28/128 by sleeve 28/128 and optionally with braze 30 or another material, corrosive fluids/contaminants from the atmosphere cannot contact and damage heater coils 26/126, increasing the life cycle of air data probe 10.

Discussion of Possible Embodiments

The following are non-exclusive descriptions of possible embodiments of the present invention.

A corrosion resistant sleeve for an air data probe with the sleeve being cylindrical in shape with a first end and a second end, at least one circumferentially extending groove on an outside of the sleeve configured to accommodate coils of a heater, and a bore at a center of the sleeve and extending between the first end and the second end configured to provide a pneumatic pathway that allows atmospheric conditions to reach measurement equipment of the air data probe.

The sleeve of the preceding paragraph can optionally include, additionally and/or alternatively, any one or more of the following features, configurations and/or additional components:

A further embodiment of the foregoing sleeve includes a tip integral with the sleeve, the tip being adjacent the first end of the sleeve with the bore extending through the tip.

A further embodiment of any of the foregoing sleeves, wherein the sleeve and tip are one continuous component.

A further embodiment of any of the foregoing sleeves, wherein the sleeve includes integral water dams or bulkheads.

A further embodiment of any of the foregoing sleeves, wherein the sleeve is tapered to fit within a tapered cavity in the shell.

A further embodiment of any of the foregoing sleeves, wherein the tip is cylindrical in shape with a larger diameter than an outer diameter of the sleeve.

A further embodiment of any of the foregoing sleeves, wherein the bore within the tip has an increasing cross-sectional area as the bore extends towards a forward end of the tip.

A further embodiment of any of the foregoing sleeves, wherein the bore is essentially conformal to the grooves in the sleeve.

A further embodiment of any of the foregoing sleeves, wherein the sleeve is designed for use with an air data probe able to measure multiple pressures (e.g., pitot, static, and/or angle of attack).

A further embodiment of any of the foregoing sleeves, wherein the sleeve is constructed from nickel.

A further embodiment of any of the foregoing sleeves, wherein the at least one groove encircles the outside of the sleeve in a spiral configuration.

A further embodiment of any of the foregoing sleeves, where the at least one circumferentially extending groove has a width sized to accommodate only one strand of the heater coils.

An air data probe includes sleeve having a first end and a second end with the sleeve including a circumferentially extending groove on an outside surface and a bore extending along a center of the sleeve between the first end and the second end, a heater having a wire coil within the groove of the sleeve, measurement equipment configured to measure atmospheric conditions provided to the measurement equipment through the bore in the sleeve, and a shell outward from the sleeve and heater coil with the shell having an opening adjacent to the bore at the first end of the sleeve. The sleeve is configured to work in conjunction with the shell and braze materials to completely encapsulate the most vulnerable portions of the heater and prevent corrosive elements from coming into contact with the heater coils.

The air data probe of the preceding paragraph can optionally include, additionally and/or alternatively, any one or more of the following features, configurations and/or additional components:

A further embodiment of the foregoing air data probe includes a tip integral with the sleeve, the tip being adjacent to the first end of the sleeve and the opening of the shell.

A further embodiment of any of the foregoing air data probes, wherein the measurement equipment is one or more absolute or differential pressure sensors.

A further embodiment of any of the foregoing air data probes, wherein the tip extends forward of the opening of the shell such that an outer surface of the tip is in contact with atmospheric conditions.

A further embodiment of any of the foregoing air data probes, wherein the outer surface of the tip and an outer surface of the shell at the opening are connected to one another with braze.

A further embodiment of any of the foregoing air data probes, wherein the bore within the tip has an increasing cross-sectional area as the bore extends towards a forward end of the tip.

A further embodiment of any of the foregoing air data probes includes braze between the sleeve and the shell.

A further embodiment of any of the foregoing air data probes includes a strut connecting the shell to an aircraft.

A further embodiment of any of the foregoing air data probes, wherein the sleeve is constructed from nickel.

A further embodiment of any of the foregoing air data probes, wherein the groove in the sleeve is a spiral such that the wire coil of the heater is a bifilar coil extending within the groove.

A further embodiment of any of the foregoing air data probes, wherein the at least one circumferentially extending groove has a width sized to accommodate only one cross section of the heater coils within the at least one circumferentially extending groove.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A corrosion resistant apparatus for an air data probe with the air data probe having an outer surface and an inner surface, the corrosion resistant apparatus comprising:
   the sleeve being cylindrical in shape with a first end and a second end;
   at least one circumferentially extending groove on an outside of the sleeve configured to accommodate heater coils;
   a bore at a center of the sleeve, forming the inner surface of the air data probe, and extending between the first end and the second end configured to provide a pneumatic pathway that allows atmospheric conditions to reach measurement equipment of the air data probe;
   a shell outward from and encasing the sleeve, the shell being nonporous to prevent contaminants from contacting the outside of the sleeve; and
   heater coils within the at least one circumferentially extending groove on the outside of the sleeve.

2. The corrosion resistant apparatus of claim 1, wherein the sleeve and tip are one continuous component.

3. The corrosion resistant apparatus of claim 1, wherein the tip is cylindrical in shape with a larger diameter than an outer diameter of the sleeve.

4. The corrosion resistant apparatus of claim 3, wherein the bore within the tip has an increasing cross-sectional area as the bore extends towards a forward end of the tip.

5. The corrosion resistant apparatus of claim 1, wherein the sleeve is constructed from nickel.

6. The corrosion resistant apparatus of claim 1, wherein the at least one groove encircles the outside of the sleeve in a spiral configuration.

7. The corrosion resistant apparatus of claim 1, wherein the at least one circumferentially extending groove has a width sized to accommodate only one cross section of the heater coils within the at least one circumferentially extending groove.

8. The corrosion resistant apparatus of claim 1, wherein the sleeve includes a tip integral with the sleeve at the first end of the sleeve and forming a portion of the outer surface of the air data probe with an entire outer diameter of the tip being equal to an outer diameter of an outer surface of the shell, the tip being adjacent the first end of the sleeve with the bore extending through the tip.

9. An air data probe comprising:
   a sleeve having a first end and a second end, the sleeve including a circumferentially extending groove on an outside surface and a bore extending along a center of the sleeve between the first end and the second end;
   a heater having a wire coil within the groove of the sleeve;
   measurement equipment in fluid communication with the bore such that the measurement equipment measures atmospheric conditions provided to the measurement equipment through the bore in the sleeve; and
   a shell outward from the sleeve and heater coil with the shell having an opening adjacent to the bore at the first end of the sleeve, the shell being nonporous to prevent contaminants from contacting the outside surface of the sleeve and heater coil;
   wherein the sleeve includes a tip integral with the sleeve at the first end of the sleeve, the tip extending passed the shell and having an outer diameter of an outer surface that is equal to an outer diameter of an outer surface of the shell, the tip being adjacent to the opening of the shell, wherein the sleeve prevents corrosive elements from coming into contact with the heater coils, wherein the circumferentially extending groove in the sleeve has a width sized to accommodate only one cross section of the wire coil within the groove.

10. The air data probe of claim 9, wherein the measurement equipment is one or more absolute or differential pressure sensors.

11. The air data probe of claim 9, wherein the tip extends forward of the opening of the shell such that an outer surface of the tip is in contact with atmospheric conditions.

12. The air data probe of claim 11, wherein the outer surface of the tip and an outer surface of the shell at the opening are connected to one another with braze.

13. The air data probe of claim 9, wherein the bore within the tip has an increasing cross-sectional area as the bore extends towards a forward end of the tip.

14. The air data probe of claim 9, further comprising:
braze between the sleeve and the shell.

15. The air data probe of claim 9, further comprising:
a strut connecting the shell to an aircraft.

16. The air data probe of claim 9, wherein the sleeve is constructed from nickel.

17. The air data probe of claim 9, wherein the groove in the sleeve is a spiral such that the wire coil of the heater is a bifilar coil extending within the groove.

* * * * *